United States Patent [19]

Tuerk

[11] Patent Number: 4,711,484
[45] Date of Patent: Dec. 8, 1987

[54] TARP COVER SYSTEM FOR FLAT BED VEHICLES

[76] Inventor: James R. Tuerk, 5231 N. Delaware St., Indianapolis, Ind. 46220

[21] Appl. No.: 16,768

[22] Filed: Feb. 19, 1987

[51] Int. Cl.⁴ .............................................. B62D 25/06
[52] U.S. Cl. .................................................. 296/105
[58] Field of Search ................................. 296/105, 100

[56] References Cited

U.S. PATENT DOCUMENTS

| | | | |
|---|---|---|---|
| 1,263,759 | 4/1918 | Hanaway | 296/105 |
| 1,613,273 | 1/1927 | Hamilton | 296/105 |
| 3,041,104 | 6/1962 | Richard | 296/100 |
| 3,231,305 | 1/1966 | Beckman | 296/105 |
| 3,310,338 | 3/1967 | Greenberg | 296/105 |
| 3,326,598 | 6/1967 | Kunsch | 296/105 |
| 3,433,470 | 3/1969 | Erke | 296/105 |
| 3,942,830 | 3/1976 | Woodward | 296/105 |
| 4,252,363 | 2/1981 | Rodrigue | 296/100 |
| 4,289,346 | 9/1981 | Bourgeois | 296/105 |
| 4,342,480 | 8/1982 | Ross, Jr. | 296/100 |
| 4,583,777 | 4/1986 | Myburgh | 296/100 |

FOREIGN PATENT DOCUMENTS 528943 7/1931 Fed. Rep. of Germany .
1469581 1/1967 France .
141191 10/1930 Switzerland .

Primary Examiner—Robert R. Song
Attorney, Agent, or Firm—Laubscher & Laubscher

[57] ABSTRACT

A tarp cover system for flat bed vehicles includes inverted U-shaped bow members that extend transversely of the vehicle, the lower ends of the leg portions of the bow members being connected with carrier devices by means of which the bow members are displaced longitudinally of the vehicle. The bow members carry a tarp cover member that covers and uncovers the vehicle bed when the bow members are displaced longitudinally between expanded and contracted conditions relative to the vehicle. The tarp member includes side portions that extend downwardly adjacent the outer surfaces of the leg portions of the bow members, and bottom flap portions that extend beneath the carrier devices and the longitudinal guide tracks within which the carrier devices travel. In order to produce compactness of the tarp system when the bow members are in the collapsed conditions, successive carrier devices are guided alternately on vertically spaced pairs of inner and outer guide rails, respectively, contained within each of the guide tracks.

14 Claims, 9 Drawing Figures

TARP COVER SYSTEM FOR FLAT BED VEHICLES

BRIEF DESCRIPTION OF THE PRIOR ART

This invention relates to an improved tarp cover system for flat bed vehicles, use being made of inverted U-shaped bow members that are longitudinally displaceable between extended and collapsed conditions to operate a tarp cover member between covered and uncovered conditions, respectively, relative to the space above the flat bed.

Such tarp systems are generally well known in the patented prior art, as evidenced, for example, by the prior patents to Kunsch U.S. Pat. No. 3,326,598, Bourgeois U.S. Pat. No. 4,289,346, Greenberg U.S. Pat. No. 3,310,338, and Erke U.S. Pat. No. 3,433,470, among others. In Kunsch, the bows are supported for displacement by rollers that ride on the lower rail of a rail pair, the struts being connected by hinged braces which in the extended position of the cover are in a substantially straight line so that the struts are held rigidly apart with respect to each other. Complex means are provided for effecting folding of the braces to permit the bows to be drawn closely adjacent one another in the folded position, whereby the cover is retracted substantially completely from over the truck bed. In Bourgeois, Greenberg and Erke, the bows are similarly supported by rollers that run in tracks.

One problem of the known tarp system is that of protecting or sealing the roller support devices and their associated guide tracks from the deleterious effects of the weather, and from road debris and foreign objects that otherwise would hinder and/or obstruct the operation of the device. Another problem is that of effecting compactness of the bow members when in the collapsed condition, whereby the maximum space above the flat bed will be exposed for the mounting and removal of objects to be transported thereon. Another problem is that of providing suitable tensioning of the tarp cover when in the bow-extended condition, thereby to prevent undersirable flapping and billowing of the tarp which reduce the operating life thereof.

SUMMARY OF THE INVENTION

Accordingly, a primary object of the present invention is to provide an improved tarp cover system for flat bed vehicles, wherein the tarp cover member serves at least in part to protect and/or enclose the bow guide tracks when the flat bed vehicle is in the fully covered condition.

According to a further object of the invention, a resilient seal member is also provided that extends longitudinally at least partially across each guide track. Bow carrier assemblies guided for longitudinal movement in the guide tracks are connected with the lower ends of the leg portions of the inverted U-shaped bow members by bow support members that extend outwardly from the guide tracks via the resilient seal members. The seal members cooperate with the tarp cover member to seal the guide track when the vehicle is in the fully covered transport condition, and also to seal the guide track when the tarp is in the vehicle-uncovered, collapsed condition.

Another object of the invention is to support the bow members for longitudinal displacement relative to the guide tracks between extended and collapsed conditions relative to the vehicle flat bed, use being made of carrier means successive ones of which are alternately mounted on inner and outer guide rails respectively, whereby the bow members may be more tightly compacted when the bows are in the collapsed condition. Each carrier means includes a carrier plate and at least two pairs of guide rollers mounted for travel on upper and lower guide rails contained within each guide track. When in the collapsed conditions, the vertical edges of the carrier plates abut the bow support members that extend laterally outwardly from the carrier plates and guide tracks for connection with the lower leg portions of the bow members, whereby the support members serve as stops for the carrier means when in the collapsed condition.

According to a more specific object of the invention, the bottom flap portions of the tarp cover member extend inwardly beneath, and are fastened to, bottom tongue portions of the carrier means that extend transversely inwardly beneath the guide rails, respectively. L-shaped stiffening members are secured between the side wall and bottom flap portions of the tarp at spaced locations between the tongues. Thus, when the bows are in the collapsed condition, the tarp cover is folded in a pleat-like manner between the tongues, and when the bows are in the extended conditions, the tarp is tensioned against buckling and flapping during vehicle transport.

BRIEF DESCRIPTION OF THE DRAWINGS

Other objects and advantages of the invention will become apparent from a study of the following specification when viewed in the light of the accompanying drawings, in which.

DETAILED DESCRIPTION

Figure 1:
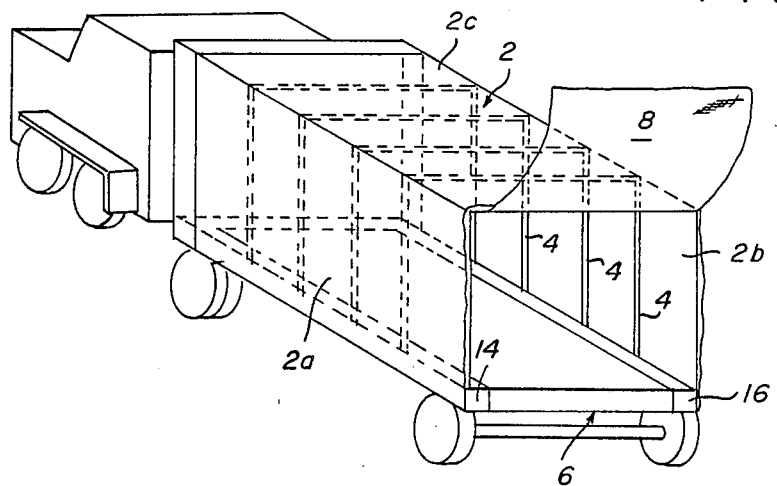
FIG. 1 is a rear perspective view of the tarp cover system of the present invention as used in connection with a flat bed vehicle, the bows of the system being shown in the expanded vehicle-covering condition.
Figure 2:
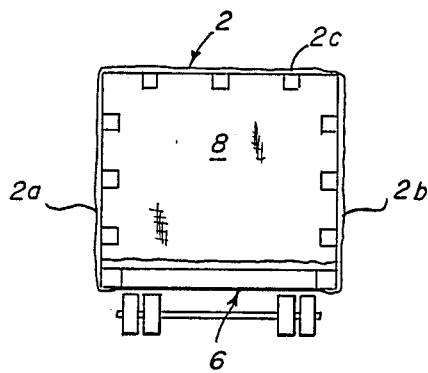
FIG. 2 is a rear end view of the vehicle with the rear tarp curtain in the closed condition.
Figure 3:
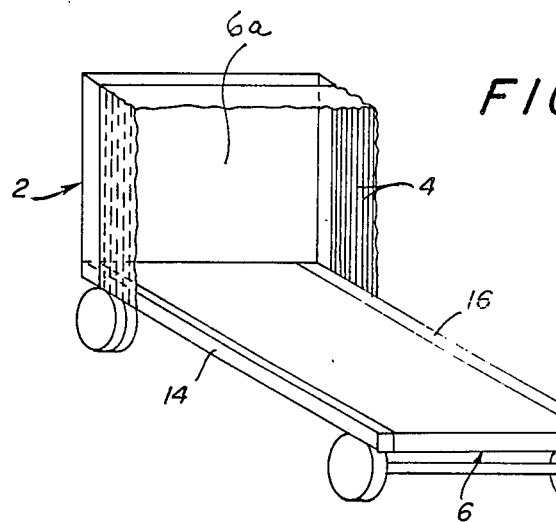
FIG. 3 is a rear end view of the vehicle with the tarp system in the collapsed vehicle-uncovering condition.
Figure 9:
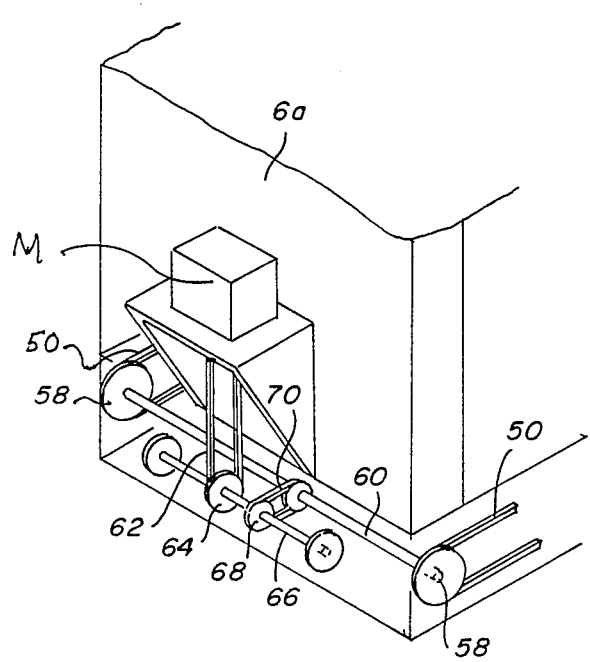
FIG. 9 is a schematic perspective view illustrating the drive means for the bow carrier devices.

Referring first more particularly to FIGS. 1-3, the tarp cover system of the present invention includes a sheet-like waterproof flexible tarp member 2 that is supported by inverted U-shaped bow members 4 for covering an enclosed space above a flat bed trailer or other vehicle 6. A rear curtain 8 is provided that may be tied down to close the rear end of the space enclosed above the vehicle bed, as shown in FIG. 2. The bow members 4 are displaceable longitudinally of the trailer bed 6 between the expanded condition of FIG. 1 and the collapsed condition of FIG. 3. To this end, the lower ends of the leg portions 4a of successive bow members 4 are connected with carrier means 10 and 12, respectively, that are longitudinally displaceable within longitudinal guide tracks 14 and 16, respectively, that are secured with opposite sides of the flat bed member 6, as shown in FIGS. 1 and 3.

Figure 4:
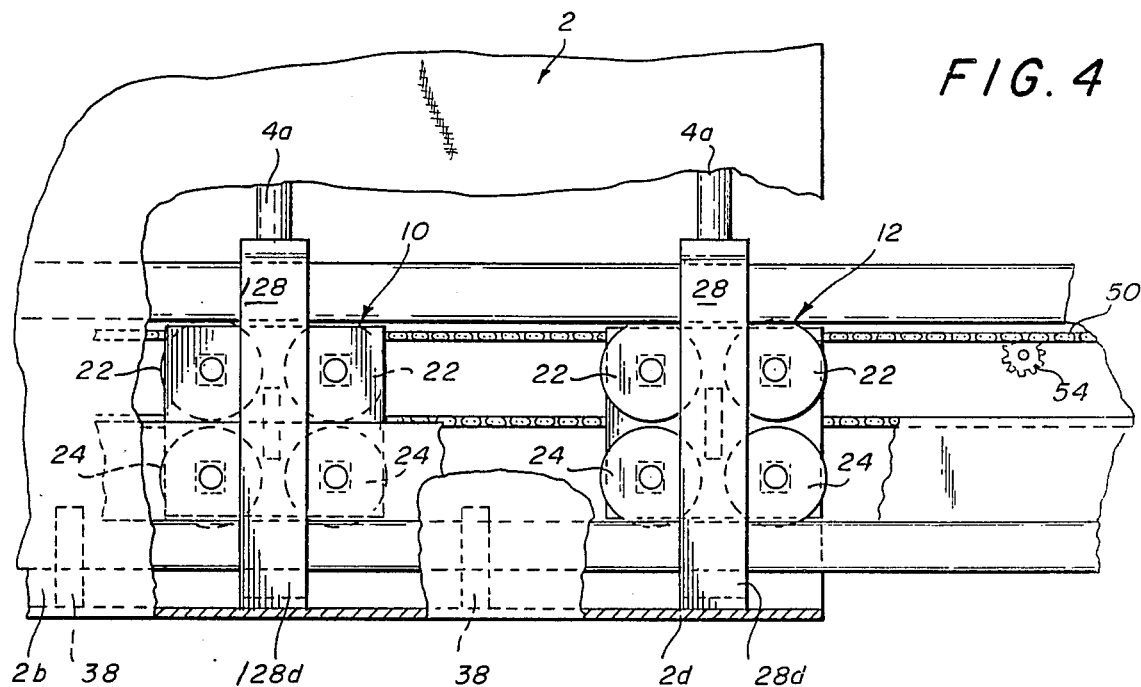
FIG. 4 is a detailed side elevational view, with certain parts broken away for clarity, of the bow carrier means, when in the expanded condition.
Figure 5:
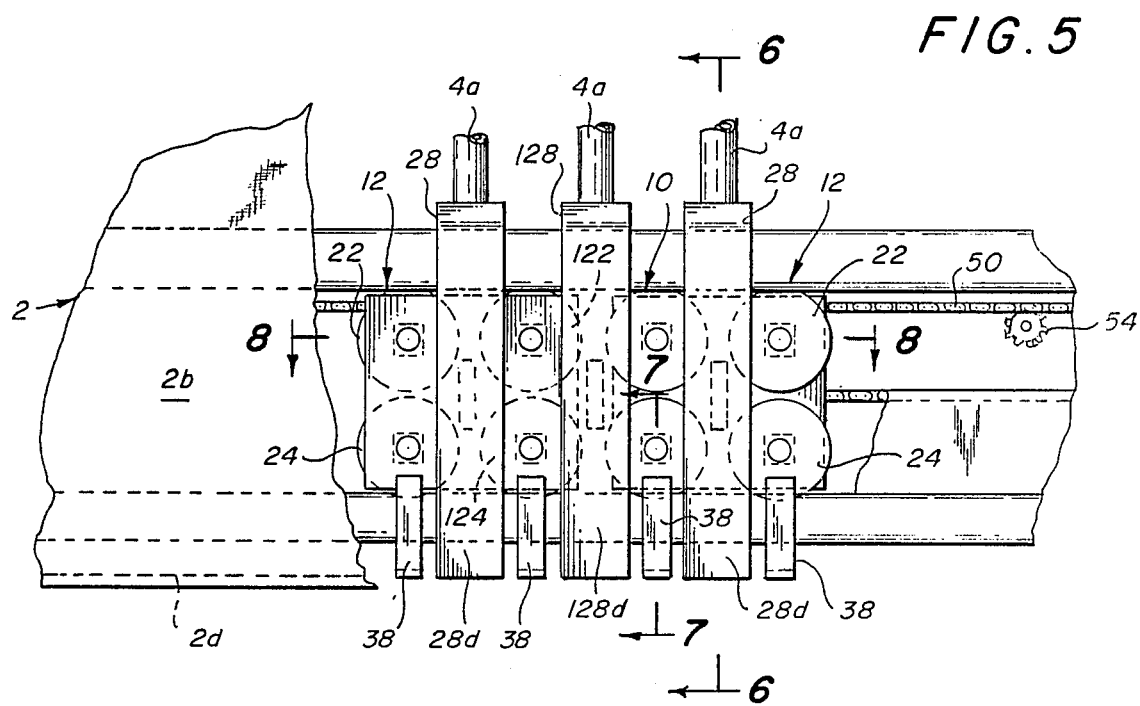
FIG. 5 is a view similar to FIG. 4 with the bow carrier members in the collapsed overlapping condition.
Figure 6:
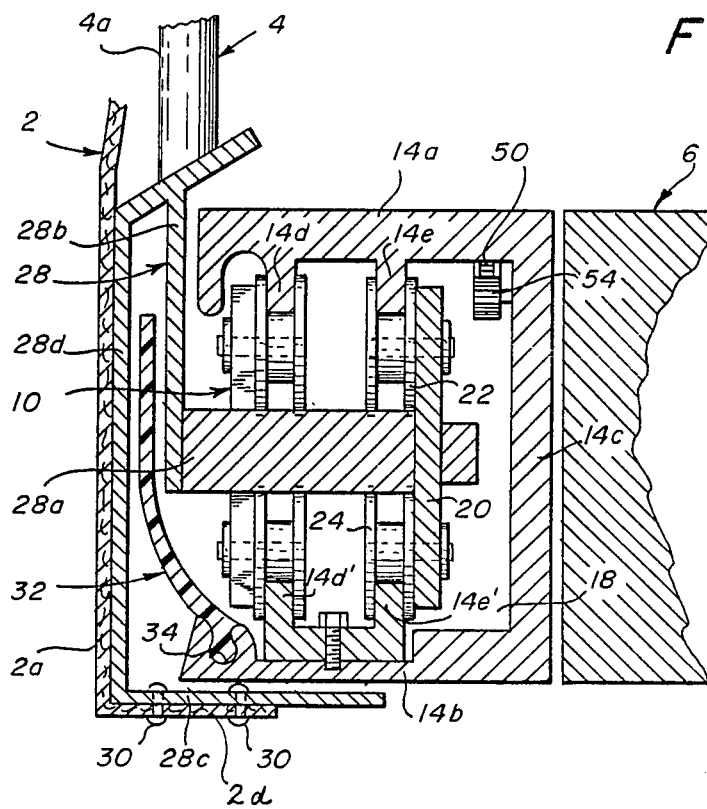
FIGS. 6-8 are sectional views taken along lines 6—6, 7—7 and 8—8, respectively, of FIG. 5.
Figure 7:
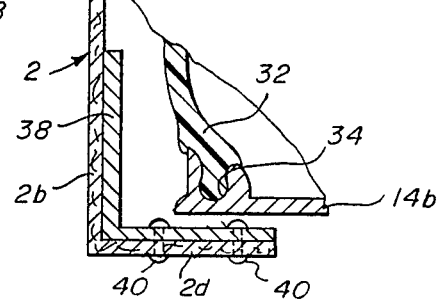

Referring now to FIG. 6, it will be seen that the guide track 14 has a generally C-shaped configuration including upper and lower flange portions 14a and 14b that are connected by a vertical center portion 14c, thereby defining a longitudinally extending lateral opening 18. The guide track includes vertically spaced outer and inner guide rails 14d and 14e, respectively, that extend longitudinally of the vehicle bed 6. The carrier means 10 12 includes a vertically arranged, longitudinally extending carrier plate 20 to which are rotatably connected pairs of upper and lower wheels 22 and 24, respectively, that are arranged for rotation about horizontal transverse axes, which rollers contain in their outer peripheries circumferenial grooves that receive the upper and lower inner guide rails 14e and 14e', respectively. The carrier plate 20 is connected with the associated bow member 4 by a bow support member 28 having a horizontal portion 28a that is connected at one end with the carrier plate 20, the other end of the horizontal portion 28a being connected with the lower end of the associated bow leg portion by the vertical portion 28b of the carrier support member 28. In accordance with an important feature of the present invention, the bow support member 28 is also provided with a tongue portion 28c that is carried by a lower end of the vertical portion 28d and extends inwardly below the longitudinal guide rail 14, as shown in FIG. 6. The side portion 2a of the tarp member 2 extends downwardly adjacent the outer surfaces of the bow members 4 and the associated carrier means and terminates at its lower end by a bottom flap portion 2d that is secured to the bottom of the tongue portion 28c by suitable means (for example, by rivets 30). In accordance with another important feature of the invention, a resilient generally-rectangular sheet-like seal member 32 is provided for covering the opening 18 contained in the guide track 14, the lower edge of the seal member being of a configuration corresponding with a groove 34 formed in the lower flange portion 14b of the guide track 14. The vertical portion 28b of the bow support member 28 extends upperwardly between the upper edge of the resilient seal member 32 and the upper flange portion 14a of the guide track 14, as shown in FIG. 6. In accordance with another important feature of the invention, the tarp member 2 is provided with a plurality of longitudinally spaced stiffening stays 38 of generally L-shaped configuration, as shown in FIG. 7, the stays having orthogonally-arranged leg portions that are secured, for example, by rivets 40, with the tarp bottom flap 2d. As shown in FIGS. 4 and 5, the stay members 38, which are formed of a suitable rigid material such as aluminum, are arranged in spaced relation relative to the carrier means 10 and 12, as shown in FIG. 4.

Figure 8:
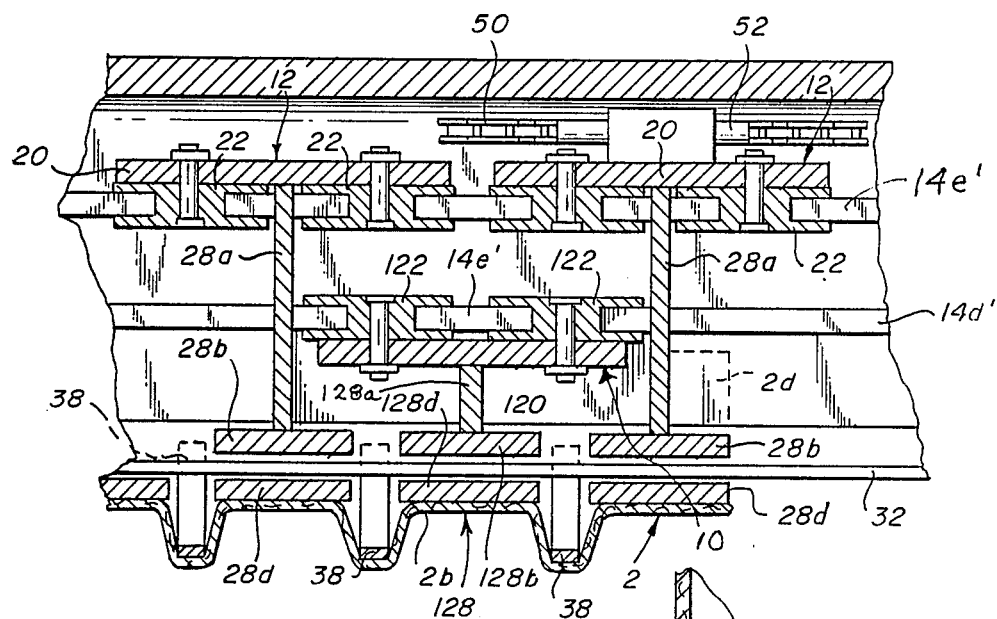

In accordance with a characterizing feature of the invention, the next successive carrier means 10 is mounted for longitudinal movement upon the outer pair of guide rails 14d and 14d', thereby to permit overlapping of the adjacent ends of the carrier means when in the collapsed condition of FIGS. 5 and 8, whereby the bow members are closely adjacent to each other when in the collapsed condition, and the maximum space about the flat bed will be exposed. The construction of the carrier means 10 is similar to that of carrier means 12, in that the bow support member 128 includes a horizontal portion 128a, and a vertical portion 128b that extends between the seal 32 and the upper flange portion 14a of the guide track for connection with the lower extremity of the leg portion 4a of the associated bow member 4, as shown in FIG. 5. Referring to FIG. 8, it will be seen that the vertical edge of the plate 120 of the second carrier means 10 abuts the horizontal portion 28a of carrier means 12, thereby limiting the extent of movement of the carrier means 10 when the system is in the collapsed condition of FIG. 8. The next successive carrier means 12 is mounted for guiding movement on the inner guide rails 14e and 14e', with the horizontal portion 28a of the bow support member being in abutting relation with the adjacent vertical edge of the plate 120 of the preceeding carrier means 10, as shown in FIG. 8.

In order to displace the bow members between their expanded and collapsed positions illustrated in FIGS. 1 and 3, respectively, the rearwardmost carrier means 12 are longitudinally driven via a pair of endless sprocket chains 50 arranged within the guide tracks 14 and 16, respectively. The lower runs of the endless guide chains 50 are connected by connecting means 52 with the plate member 20 of carrier means 12, the upper runs of the chains being supported by idler sprockets 54, as shown in FIGS. 4-6. At its forward end, each of the sprocket chains 50 is mounted on a drive sprocket 58 that is secured to the associated end of transverse shaft 60 that is driven from motor M via drive chain 62, sprocket gear 64, intermediate shaft 66, sprocket gear 68, and intermediate sprocket chain 70. The motor end drive chain means are mounted on the fixed forward vertical wall 6a of the flat bed vehicle 6. Of course, if desired, the drive chains 50 could be driven manually by suitable hand crank means, not shown.

OPERATION

In operation, assuming that the flat bed vehicle is in the fully covered condition of FIG. 1, the rear curtain 8 can be lowered and tied down to the closed condition of FIG. 2, whereupon owing to the connection of the tarp bottom flaps 2d with the bottom tongue portions 28c (FIG. 6), and to the provision of the L-shaped stay members 38 (FIG. 7), the tarp cover member is properly tensioned for transport in such a manner that buckling or flapping of the tarp is avoided. The guide tracks are sealed against road debris both by the cover bottom flap and side wall portions, and by the seal members 32.

To uncover the flat bed vehicle, the rear curtain member 8 is untied, and the motor drive means M is actuated to transport the rearwardmost carrier means 12 of each guide track forwardly of the vehicle. As shown in FIG. 8, the horizontal portion 28a of the support member of the rearwardmost carrier means 12 engages the rear vertical edge of the carrier plate 120 of the next successive carrier means 10, thereby to cause this carrier means, and the portion of the tarp fastened thereto, to move forwardly of the flat bed. When the forward edge of carrier plate 120 engages the horizontal portion 28a of the support means of the next successive carrier means 12, this carrier means, and the tarp portion fastened thereto, are also moved forwardly to displace the bows toward their collapsed condition. As shown in FIG. 8, owing to the mounting of successive carrier means on the associated inner and outer guide rails, respectively, the adjacent ends of the carrier members overlap, with the advantageous result that the bows are in tightly compacted relation when in the completely collapsed condition, thereby fully uncovering the space above the vehicle flat bed.

To recover the vehicle, the motor M is driven in the opposite direction to rearwardly displace the rearwardmost carrier means of each guide track, and owing to their connections with the tarp cover, the remaining carrier means are displace rearwardly to correspondingly displaced the bows rearwardly toward their tarp-covered condition of FIG. 1.

What is claimed is:

1. A tarp system for covering a load arranged on a flat bed vehicle, comprising:
   (a) a pair of longitudinal guide tracks adapted for mounting adjacent the opposite sides of the vehicle flat bed;
   (b) a plurality of longitudinally arranged inverted U-shaped bow members each having a first generally horizontal portion extending transversely in spaced relation above the vehicle flat bed, and a pair of downwardly depending vertical leg portions the lower ends of which terminate adjacent said guide tracks, respectively;
   (c) a plurality of carrier means connecting the lower ends of said bow leg portions for sliding movement relative to the associated guide track, respectively, said bow members normally having an expanded vehicle-covered condition relative to each other in which said bow members are spaced longitudinally of the flat bed vehicle;
   (d) a sheet-like flexible tarp cover member supported by said bow members to enclose at least a portion of the space above the flat bed vehicle when said bow members are in said expanded vehicle-covered condition, said tarp member having a top portion supported by said bow horizontal portions, a pair of side portions extending downwardly adjacent the external surfaces of said bow leg portions, respectively, and a pair of horizontal bottom flap portions that extend inwardly from the lower ends of said side portions beneath said carrier means and said guide rails, respectively; and
   (e) means for relatively displacing said bow members between said expanded condition and a collapsed vehicle-uncovered condition in which said bow members are adjacent each other and said tarp member is collapsed to uncover said flat bed portion.

2. Apparatus as defined in claim 1, wherein said carrier means include horizontal tongue portions that extend inwardly of said flat bed vehicle beneath said guide tracks, respectively, said tarp flap portions extending beneath, and being fastened to, said tongue portions, respectively.

3. Apparatus as defined in claim 2, and further including a plurality of generally L-shaped stay members connected with said tarp member at spaced locations between said carrier means, respectively, each of said stay members including vertical and horizontal portions connected with the associated tarp bottom flap portions, respectively.

4. Apparatus as defined in claim 2, wherein each of said guide tracks contains on its outer side surface a longitudinally extending opening, said guide tracks further including opposed pairs of parallel laterally-spaced longitudinally-extending inner and outer guide rails mounted in said opening;
   and further wherein each of said carrier means includes:
   (1) a vertically-arranged longitudinally extending carrier plate mounted in the opening contained in the associated guide track; and
   (2) upper and lower pairs of longitudinally spaced circumferentially grooved guide wheels connected with said carrier plate for rotation about transverse horizontal axis relative to said flat bed, respectively;
   (3) the grooved wheels of successive carrier means associated with a given guide track being mounted on alternate pairs of said guide rails, respectively, thereby to cause the adjacent ends of the carrier means to overlap when the bow members are in the collapsed second condition, whereby tight packing of the bow members and attendant collapsing of the tarp member are achieved.

5. Apparatus as defined in claim 4, wherein each of said carrier means further includes a bow support member having a horizontal portion extending at one end from said carrier plate laterally outwardly of the associated opening, and a vertical portion connecting the free end of said horizontal portion with the lower end of the leg portion of the associated bow member.

6. Apparatus as defined in claim 5, wherein the vertical edges of the carrier plates of the carrier means mounted on the outer rails abut the bow support horizontal portions of the adjacent carrier means mounted on the inner rails, respectively, when said bow members are in the collapsed condition.

7. Apparatus as defined in claim 4, and further including resilient seal means mounted on said guide tracks for sealing said openings contained therein.

8. Apparatus as defined in claim 7, wherein said resilient seal means comprises a generally vertically arranged resilient sealing strip of generally retangular configuration the lower horizontal edge of which is mounted in a longitudinal groove contained in the associated guide track adjacent the opening contained therein, said bow support vertical portion extending upwardly between the upper horizontal edge of said resilient seal and the associated guide track.

9. Apparatus as defined in claim 8, wherein each of said carrier tongue portions is carried by the lower end of a vertical carrier portion that extends upwardly externally of said resilient seal member, the upper end of said carrier portion being connected with said bow support vertical portion.

10. Apparatus as defined in claim 1, and further including drive means for simultaneously displacing said carrier means longitudinally of said guide tracks.

11. Apparatus as defined in claim 10, wherein said drive means comprise a pair of drive members associated with said guide tracks, respectively, said drive members being connected with the rearmost said carrier means associated with each of said guide tracks, respectively.

12. Apparatus as defined in claim 4, wherein each of said guide tracks is sectional, the lower inner and outer rails of said rail pairs comprising a integral removably connected section, thereby to permit assembly of said carrier means in said guide track openings.

13. Apparatus as defined in claim 8, wherein said resilient seal member is mounted in its associated groove for removable longitudinally slidable movement.

14. Apparatus as defined in claim 1, and further including a rear curtain tarp member operable when said bow members are in their expanded first condition to close one end of the space enclosed by said tarp member.

* * * * *